(12) United States Patent
Nijhuis et al.

(10) Patent No.: US 12,440,843 B2
(45) Date of Patent: Oct. 14, 2025

(54) APPARATUS AND A METHOD FOR EX-VIVO MEASUREMENT OF PERFORMANCE OF A DONOR HEART

(71) Applicants: Organ Assist B.V., Groningen (NL); Rijksuniversiteit Groningen, Groningen (NL); Academisch Ziekenhuis Groningen, Groningen (NL)

(72) Inventors: Foppe Nijhuis, Garijp (NL); Arjan Van Der Plaats, Meeden (NL); Michiel Elardus Erasmus, Groningen (NL)

(73) Assignees: XVIVO HOLDING B.V., Groningen (NL); RIJKSUNIVERSITEIT GRONINGEN, Groningen (NL); ACADEMISCH ZIEKENHUIS GRONINGEN, Groningen (NL)

( * ) Notice: Subject to any disclaimer, the term of this patent is extended or adjusted under 35 U.S.C. 154(b) by 1129 days.

(21) Appl. No.: 17/421,114

(22) PCT Filed: Jan. 10, 2019

(86) PCT No.: PCT/NL2019/050013
§ 371 (c)(1),
(2) Date: Jul. 7, 2021

(87) PCT Pub. No.: WO2020/145814
PCT Pub. Date: Jul. 16, 2020

(65) Prior Publication Data
US 2022/0152607 A1    May 19, 2022

(51) Int. Cl.
*A01N 1/143* (2025.01)
*B01L 3/00* (2006.01)
(52) U.S. Cl.
CPC .............. *B01L 3/505* (2013.01); *A01N 1/143* (2025.01); *B01L 2200/026* (2013.01);
(Continued)

(58) Field of Classification Search
CPC .............. B01L 3/505; B01L 2200/026; B01L 2200/0689; B01L 2300/0609;
(Continued)

(56) References Cited

U.S. PATENT DOCUMENTS 5,586,438 A  * 12/1996  Fahy ...................... A01N 1/02
                                                435/284.1
6,582,953 B2 *  6/2003  Brasile ................. A01N 1/0247
                                                435/284.1
(Continued)

FOREIGN PATENT DOCUMENTS

CN    103750905 A    4/2014
CN    105579045 A    5/2016
(Continued)

OTHER PUBLICATIONS

Search results from Office Action issued in Chinese Application No. 2019800870513 dated Feb. 18, 2022, 2 pages.
(Continued)

*Primary Examiner* — Navin Natnithithadha
(74) *Attorney, Agent, or Firm* — Chrisman Gallo Tochtrop LLC

(57) ABSTRACT

An apparatus (1) for ex-vivo measurement of performance of a donor heart (2) has a heart holder (6) in a receptacle (7) for holding a human donor heart and a bag (17) for placement into a left ventricle of the heart. The bag has a bag interior space communicating with an interior space of a fluid tight, compressible and expandable container (19. The apparatus further includes a sensor (21) for measuring compression and expansion of the container. Using the apparatus, cardiac output can be measured by measuring expansion and contraction of the container. A method for
(Continued)

ex-vivo measurement of performance of a donor heart is also described. The method may include controlling the preload and/or the afterload.

19 Claims, 3 Drawing Sheets

(52) U.S. Cl.
CPC .............. *B01L 2200/0689* (2013.01); *B01L 2300/0609* (2013.01); *B01L 2300/0663* (2013.01); *B01L 2300/14* (2013.01); *B01L 2400/0403* (2013.01)

(58) Field of Classification Search
CPC ........ B01L 2300/0663; B01L 2300/14; B01L 2400/0403; A01N 1/143; H10H 20/01335
USPC ............... 600/485, 486, 488, 508, 481, 483
See application file for complete search history.

(56) References Cited

U.S. PATENT DOCUMENTS

| | | | | |
|---|---|---|---|---|
| 6,953,655 | B1* | 10/2005 | Hassanein | A01N 1/10 435/1.3 |
| 7,651,835 | B2* | 1/2010 | Hassanein | A01N 1/0247 435/1.2 |
| 8,304,181 | B2* | 11/2012 | Hassanein | A01N 1/02 435/1.1 |
| 8,409,846 | B2* | 4/2013 | Hassanein | A01N 1/16 435/284.1 |
| 8,420,380 | B2* | 4/2013 | Fishman | A01N 1/143 435/284.1 |
| 8,465,970 | B2* | 6/2013 | Hassanein | A01N 1/02 435/297.2 |
| 8,535,934 | B2* | 9/2013 | Hassanein | A61M 11/042 435/284.1 |
| 8,585,380 | B2* | 11/2013 | Hassanein | A01N 1/126 417/474 |
| 8,822,203 | B2* | 9/2014 | Hassanein | A01N 1/0247 435/284.1 |
| 9,055,740 | B2* | 6/2015 | Hassanein | A01N 1/142 |
| 9,215,867 | B2* | 12/2015 | Hassanein | A01N 1/02 |
| 9,247,728 | B2* | 2/2016 | Fishman | A01N 1/122 |
| 9,301,519 | B2* | 4/2016 | Hassanein | A01N 1/02 |
| 9,457,179 | B2* | 10/2016 | Hassanein | A61N 1/0488 |
| 9,462,802 | B2* | 10/2016 | Fishman | A01N 1/02 |
| 9,516,875 | B2* | 12/2016 | Fishman | A01N 1/0247 |
| 9,756,849 | B2* | 9/2017 | Hassanein | A01N 1/16 |
| 9,756,850 | B2* | 9/2017 | Hassanein | A01N 1/0247 |
| 9,756,851 | B2* | 9/2017 | Hassanein | A01N 1/02 |
| 9,814,230 | B2* | 11/2017 | Fishman | A01N 1/122 |
| 9,894,894 | B2* | 2/2018 | Hassanein | A01N 1/10 |
| 10,076,112 | B2* | 9/2018 | Hassanein | C12M 21/08 |
| 10,314,303 | B2* | 6/2019 | Hassanein | A01N 1/142 |
| 10,321,676 | B2* | 6/2019 | Hassanein | A01N 1/02 |
| 10,327,443 | B2* | 6/2019 | Hassanein | A01N 1/168 |
| 2002/0012988 | A1* | 1/2002 | Brasile | A01N 1/02 435/284.1 |
| 2005/0147958 | A1* | 7/2005 | Hassanein | A01N 1/122 435/284.1 |
| 2006/0148062 | A1* | 7/2006 | Hassanein | A01N 1/142 435/284.1 |
| 2006/0154358 | A1* | 7/2006 | Hassanein | A01N 1/126 435/284.1 |
| 2006/0154359 | A1* | 7/2006 | Hassanein | A01N 1/10 435/284.1 |
| 2006/0160204 | A1* | 7/2006 | Hassanein | A01N 1/0247 435/284.1 |
| 2007/0190636 | A1* | 8/2007 | Hassanein | A01N 1/126 435/284.1 |
| 2007/0275364 | A1* | 11/2007 | Hassanein | A01N 1/0247 435/284.1 |
| 2008/0234768 | A1* | 9/2008 | Hassanein | A61N 1/0488 607/4 |
| 2013/0078710 | A1* | 3/2013 | Hassanein | A01N 1/143 435/284.1 |
| 2013/0295552 | A1* | 11/2013 | Hassanein | A01N 1/0247 435/1.2 |
| 2015/0264918 | A1* | 9/2015 | Hassanein | A01N 1/143 435/1.2 |
| 2016/0095308 | A1* | 4/2016 | Hassanein | A01N 1/142 435/284.1 |
| 2016/0113269 | A1* | 4/2016 | Woodard | A01N 1/0247 435/284.1 |
| 2016/0374332 | A1* | 12/2016 | Hassanein | A01N 1/143 435/1.2 |
| 2017/0150712 | A1* | 6/2017 | Hassanein | A01N 1/122 |
| 2017/0156311 | A1* | 6/2017 | Hassanein | A01N 1/10 |
| 2018/0153158 | A1* | 6/2018 | Hassanein | A01N 1/0247 |
| 2019/0246630 | A1* | 8/2019 | Hassanein | A01N 1/142 |
| 2019/0261626 | A1* | 8/2019 | Hassanein | A01N 1/10 |
| 2019/0269125 | A1* | 9/2019 | Hassanein | A01N 1/168 |

FOREIGN PATENT DOCUMENTS

| | | |
|---|---|---|
| CN | 106028807 A | 10/2016 |
| WO | 88/05261 | 7/1988 |
| WO | 2013/106908 | 7/2013 |
| WO | 2014/194349 | 12/2014 |

OTHER PUBLICATIONS

International Search Report for corresponding International Application No. PCT/NL2019/050013 dated Oct. 11, 2019, 5 pages.
Farine et al., "Development of a cardiac loading device to monitor cardiac function during ex vivo graft perfusion," PLOS One, vol. 13, No. 4, 2018, 14 pages.
Osaki et al., "Functional evaluation of human donation after cardiac death donor hearts using a continuous isolated myocardial perfusion technique: Potential for expansion of the cardiac donor population," The Journal of Thoracic and Cardiovascular Surgery, vol. 148, No. 3, 2014, 8 pages.
Ozeki et al., "Heart Preservation Using Continuous Ex Vivo Perfusion Improves Viability and Functional Recovery," Circulation Journal, vol. 71, 2007, 7 pages.
Schechter et al., "An Isolated Working Heart System for Large Animal Models," Journal of Visualized Experiments, vol. 88, 2014, 9 pages.
Budrikis et al., "Function of Adult Pig Hearts After 2 and 12 Hours of Cold Cardioplegic Preservation," The Society of Thoracic Surgeons, 1998; 66; 6 pages.

* cited by examiner

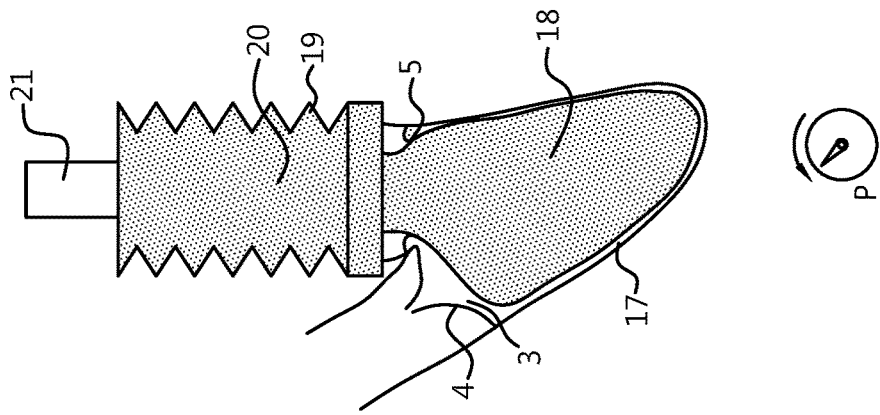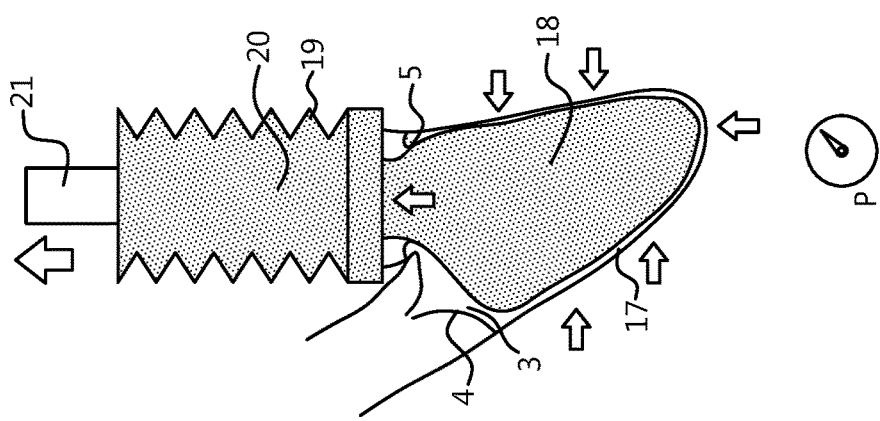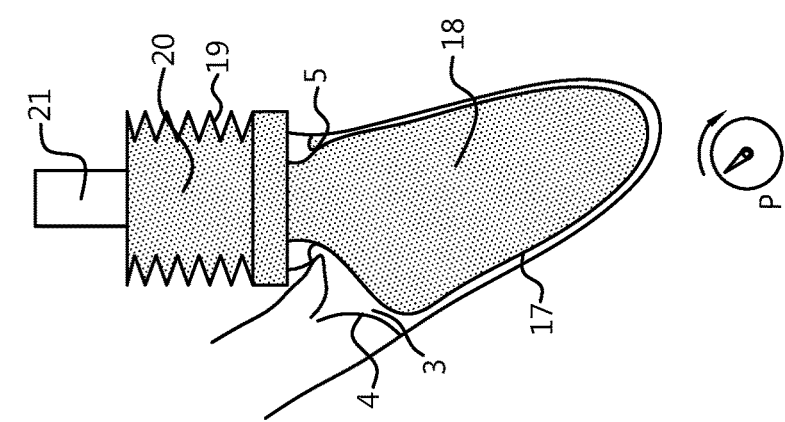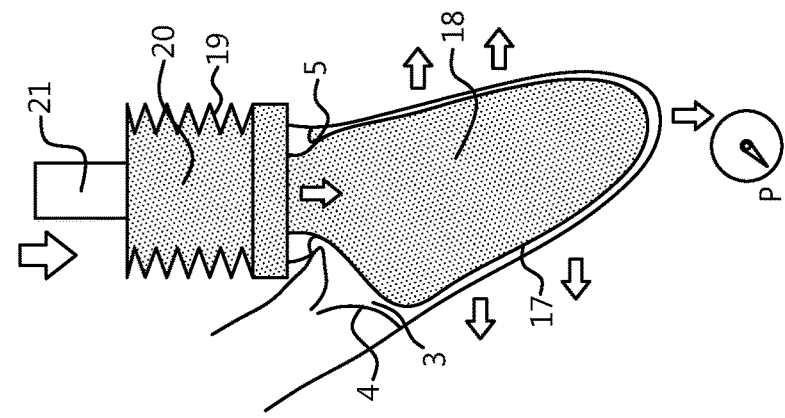

APPARATUS AND A METHOD FOR EX-VIVO MEASUREMENT OF PERFORMANCE OF A DONOR HEART

FIELD AND BACKGROUND OF THE INVENTION

The invention relates to an apparatus and a method for ex-vivo measurement of performance of a donor heart.

For ex-vivo assessment of the viability of a donor heart ventricular pressure-volume recording can provide an indication of the pumping behaviour of a donor heart. Apparatus for performing measurements on a heart ex-vivo are typically used for studies of the human or animal heart in scientific research.

For instance *An Isolated Working Heart System for Large Animal Models*; Schechter, M. A. et al.: J. Vis. Exp. (88), e51671, doi:10.3791/51671 (2014), discloses in-vitro measurements on a beating heart involving use of a preload chamber for generating a preload, a transapically placed PV catheter extending through an incision, a roller pump and a centrifugal pump for controlling afterload.

In *Function of adult pig hearts after 2 and 12 hours of cold cardioplegic preservation*; Budrikis, A. et al.; Ann Thorac Surg. 1998 July; 66(1):73-8, measurements on a pig heart are described for which the left atrium was opened between the pulmonary veins, and an artificial, Y-shaped valve apparatus, constructed from stiff plastic tubes was inserted. An artificial valve was placed in the aortic branch and one in the atrial branch of the apparatus, allowing only unidirectional flow in each branch. A flexible latex balloon was tied over the tip of the ventricular branch and inserted into the left ventricle through the mitral valve of the isolated heart. A plastic tube, connected to the aortic branch of the apparatus, was elevated 60 cm above the heart before entering an open (atrial) reservoir. With a flow rate of 5 L/min through this part of the tube system the resistance was calculated to be 1,300 dynes·s·cm$^{-5}$, which is described to be comparable with the systemic vascular resistance measured in the donor pigs before harvesting of the heart. Another tube was connected the bottom of the atrial reservoir with the atrial branch of the valve apparatus. Balloon, tubes, and reservoir were filled with 0.9% NaCl at 37° C. The reservoir was placed at the level necessary to create a filling pressure of 20 mm Hg in the balloon inserted into the left ventricle of the non-beating heart. A second flow probe was implanted to measure the flow rate through the aortic branch, i.e. cardiac output (CO).

In clinical practice however, reliable indications for predicting the viability of a donor heart need to be obtained with minimal interference and in particular minimal damage to the heart and minimal risk of contamination of the heart.

SUMMARY OF THE INVENTION

It is an object of the present invention to provide as apparatus and a method for measuring indications for predicting the viability of a donor heart with minimal interference and in particular minimal damage to the heart and minimal risk of contamination of the heart.

According to the invention, this object is achieved by providing an apparatus according to claim 1. For achieving this object, the invention also provides a method according to claim 10.

In view of the simple design with few parts of the provided or used apparatus, sterility of all surfaces to which the heart and fluids flowing to the heart can be exposed in a reliable and simple manner.

Particular elaborations and embodiments of the invention are set forth in the dependent claims.

Further features, effects and details of the invention appear from the detailed description and the drawings.

BRIEF DESCRIPTION OF THE DRAWINGS

FIGS. 2A-D is a schematic cross-sectional view of a left ventricle with a bag, a container and an actuator/sensor of an example of a apparatus according to the invention in successive stages of a heart beat cycle.

DETAILED DESCRIPTION

Figure 1:
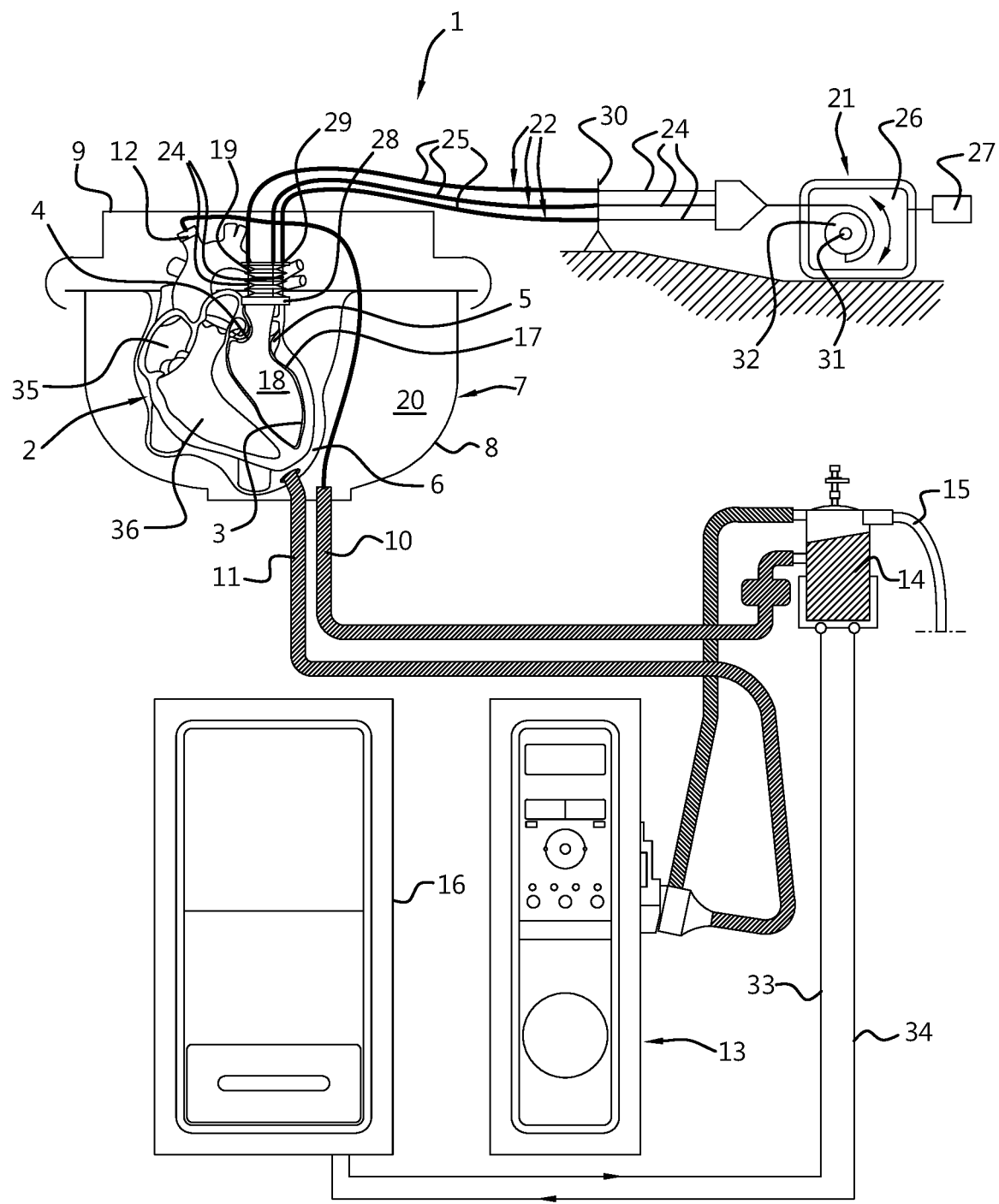
FIG. 1 is a schematic representation of an example of an apparatus according to the invention.

In FIG. 1, an example of an apparatus 1 according to the invention for ex-vivo measurement of performance of a donor heart 2 is shown. The donor heart is shown in cross-section along a plane through the left ventricle 3, the aortic valve 4 and the mitral valve 5. The heart 2 is held in a heart holder 6 which is in this example a flexible support 6 in a receptacle 7 with a bottom part 8 and a lid 9. The lid 9 hermetically seals off the receptacle 7 when in closed condition coupled to the bottom part 8 of the receptacle 7.

For perfusing the heart 2, a perfusion supply conduit 10 extends into and through the receptacle 7 and is connected to an aortic branch by a connector 12. The perfusate introduced into the aorta flows as coronary flow from the aorta through the coronary arteries (not shown) of the heart and drains into the reservoir 7 via the right atrium 35 and optionally via the right ventricle 36. For discharging fluid drained from the heart, a perfusion discharge conduit 11 is connected to the receptacle 7. A perfusion pump unit 13 and an oxygenator 14 are connected in fluid communication between the perfusion supply conduit 10 and the perfusion discharge conduit 11. An oxygen supply line 15 is connected to the oxygenator 14. For controlling the temperature of the heart 2, a thermostatic control unit 16 communicates with the oxygenator 14 via conduits 33, 34, through which a heat transfer medium such as water is circulated.

If a heart 2 is heated up from a cold non-beating condition, the heart will generate its own rhythm, while defibrillating actions may be required. The pace of the heart may also be adjusted or conducted by an artificial pacemaker.

A bag 17 is arranged in the left ventricle 3 of the heart (see also FIGS. 2A-2D). The bag 17 bounds a bag interior space 18 communicating with an interior space 20 (FIGS. 2A-2D) of a fluid tight, compressible and expandable container 19 on the atrium side of the mitral valve 5, so that fluid can flow from the interior space 18 of the bag 17 into the interior space 20 of the container 19 and back. Furthermore, a sensor 21 for measuring compression and expansion of the container 19 is provided. In this example, the sensor 21 is coupled to the container 19 via Bowden cables 22. Flow from the cavity 3 of the left ventricle through the aortic valve 4 to the aorta is blocked by the bag 17, and so the passage through the mitral valve 5 is the only inlet and outlet of the ventricular cavity 3. This allows inflow and outflow to be detected by volume changes of a single vessel 19 in fluid communication with the bag 17.

The fluid in the bag 17 and in the container 19 may be gaseous (e.g. air) or liquid. An advantage of a gaseous fluid is that the combination of the bag 17 and of the container 19 is light, that the fluid itself generates very little flow resistance and that the fluid has very little thermal capacity, so that thermal control of the fluid is of relatively little importance. An advantage of providing a liquid as the fluid in the bag 17 and in the container 19 is that it is not compressible and, compared with a gaseous fluid, its flow resistance and specific mass is more similar to those of blood with regard to the way it loads the left ventricular 3.

The bag 17 has a bag wall which rests against the left ventricle wall, so that, at its maximum volume during the measurements, the bag wall is substantially free from elastic stretch in a plane of the bag wall and subjected to very little strain in the plane of the bag. Thus, pressure and volume in the interior 18 of the bag 17 and in the interior 20 of the container 19 are not significantly influenced by elastic stretching of the wall of the bag 17. The bag 17 is shaped to be larger than the shape of an interior of the left ventricle by a small margin only and of a shape similar to the shape of the interior of the left ventricle 3, to limit bulging towards the aortic valve 4. In order of increasing preference, the oversize in any direction is preferably not more than 40, 30 resp. 20%.

The heart holder 6 is arranged in the receptacle 7, which also encloses the heart 2, the bag 17 and the container 19. The sensor 21 is composed of a motor 26 with an encoder and a control unit 27 and also forms an actuator. The sensor and the actuator may also be provided as separate items, for instance by providing a force sensor arranged for sensing forces exerted via a transfer mechanism between the actuator and the container.

The sensor 21 is arranged outside of the enclosure 7. The Bowden cables 22 form a motion transfer mechanism extending from the container 19 to the actuator and sensor 21 for transferring motion from the container 19 to the sensor 21 and from the actuator 21 to the container 19. Thus, the actuator and sensor 21 can be arranged outside of the interior of the enclosure 7 of which sterility needs to be ensured. This facilitates sterilization and avoids the need of subjecting the actuator and/or sensor to sterilization treatments. Provision of alternative motion transfer mechanisms, such as a belt drive, a chain drive, a toothed rack drive, a (preferably non self-braking) spindle drive, a hydraulic drive and a lever with push and/or pull rods, are conceivable as well.

The Bowden cables 22 form a simple and flexible motion transfer mechanism that allows easy handling of the bag 17 and the container 19 when coupled to the motion transfer mechanism. By coupling the container 19 to the motion transfer mechanism before insertion of the bag 17 into the left ventricle 3, the need of manipulation of and around the exposed heart 2 is reduced.

Core cables 24 (i.e. internal cables) of the Bowden cables 22 are coupled to a support 28 to which the a first end of the container 19 and an open end of the bag 17 are mounted and which is essentially stationary relative to the area of the mitral valve 5 via which the bag 17 projects into the left ventricle 3. A second end of the container 19 opposite to the first end of the container 19 is coupled to an actuating member 29 to which distal ends of the outer cables 25 of the Bowden cables 22 are coupled. Proximal ends of the outer cables 25 of the Bowden cables 22 are coupled to a Bowden cable abutment 30 which is in a fixed position relative to an axis of rotation of a shaft 31 and a drum 32 mounted to that shaft 31. If the core cables 24 are pulled by rotation of the drum 32, distal ends of the corresponding core cables 24 and outer cables 25 move towards each other. This causes the support 28 and the actuating member 29 to move towards each other, so that the opposite ends of the container, which are coupled to the support 28 and the actuating member 29, are moved towards each other and the container 19 is compressed. Conversely, if the core cables 24 are veered out by rotation of the drum 32 in an opposite sense, the container 19 expands. Veering out of the cables 24 preferably occurs passively or while a braking force exerted by the motor 26 is used to generate and control an afterload against which the heart 2 has to pump.

If, as in the present example, the container 19 is arranged for expansion in substantially one direction only and compression in an opposite direction only, the volume changes of the container 19 can be detected in a simple manner by detecting the expansion and compression in these, mutually opposite, directions. Other manners of detecting changes of the fluid volume in the container are conceivable as well, for instance detection of a fluid level in a rigid container or detection of a fluid volume in the rigid container, for instance by means of a level of an indicator liquid separated from the fluid flowing into and out of the ventricle by a membrane.

The container 19 is in the form of a bellows. This allows the expandability and compressibility in essentially one direction only to be achieved in a simple manner. Furthermore, sterility of the interior of a bellows can be reliably ensured.

Using an apparatus according to the invention, cardiac output can be measured in a simple manner by measuring expansion and contraction of the container 19. Because of the simple design of the apparatus, with few parts, sterility of all surfaces to which the heart 2 and fluids flowing to the heart 2 can be exposed, can be ensured in a reliable and simple manner.

The motor 26 serves for exerting a compression force on the container 19 and the motor control unit 27 serves for controlling the compression. This allows to periodically exert a preload urging fluid from the container 19 into the bag 17 in the left ventricle 3, which simulates a pressure at which, in-vivo, blood is pressed from the left atrium into the left ventricle 3 during the last part of diastole. The preload may be controlled by controlling the compression force and thereby a preload pressure, by controlling compression displacement and/or motion and thereby preload fluid displacement and/or flow, or by a combination of force and displacement and/or motion in accordance with a predetermined constant or varying relationship.

In the present example the functionality of the left ventricle is measured. In a similar manner, the functionality of the right ventricle 36 may be tested.

The motor 26 also forms a transducer for outputting a signal in response to an expansion of the container 19, as a result of pumping action by the heart, to the control unit 27. The control unit 27 is arranged for controlling and registering a counterforce exerted by the motor 26 onto the container 19 against the expansion of the container 19. Such a counterforce simulates an afterload encountered in-vivo during systole as the left ventricle 3 contracts and causes blood toe be expelled into the aorta. Thus, the combination 21 of the motor 26 and the controller 27 operate as a sensor and as an actuator.

The counterforce can be varied during each cycle to simulate the resistance and elasticity of the cardiovascular system and the inertia of blood in that cardiovascular system. The counterforce may be controlled as a function of fluid displacement and/or flow as sensed in the form of sensed expansion and/or expanding motion of the container.

Figure 3:
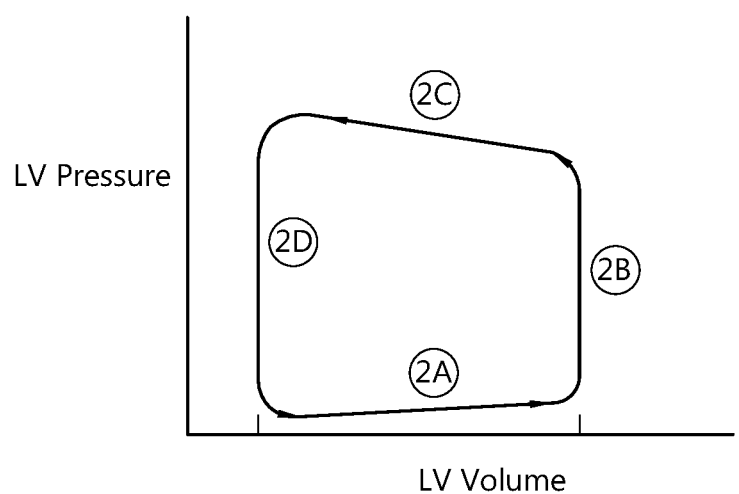
FIG. 3 is a schematic pressure/volume diagram.

As is shown in FIGS. 2A-2D and in the diagram shown in FIG. 3, preloads and afterloads during the ex-vivo heart validation test are generated in a simple manner by influencing expansion and compression of the container 19. This could for instance, in part, be achieved by providing the container and/or material in which it is embedded with suitable mechanical properties. However, in addition, or substantially as an alternative, an active control of preload and afterload, is advantageous to also allow simulation of the in-vivo effects of the closing of the aortic valve and the inertia of the blood.

The container 19 and the bag 17 in the ventricular cavity 3 bound a common, hermetically enclosed volume. When the heart 2 is contracting (FIG. 2B) pressure in the bag 17 in the left ventricle 3 increases (see dial P) and fluid is expelled from the bag 17 into the container 19 which causes the container volume to increase while pressure remains substantially constant (FIG. 2C).

The pressure in the container 19 can be determined by measuring a force exerted by the expanding container 19, which force can also be influenced by a resistance to which expansion of the container 19 is subjected. The relationship between the pressure in the container 19, the exerted force and a surface area of the container 19 facing in a direction opposite to the direction in which the force is exerted can be expressed as:

$$P = F/A \quad (1)$$

in which P=pressure, F=exerted force and A=surface area facing in a direction opposite to the direction in which the force is exerted.

The relationship between the fluid volume displaced into the container 19, the distance of displacement of a container wall and a surface area of the displaced container wall facing in a direction opposite to the direction of wall displacement can be expressed as:

$$\Delta V = D \cdot A \quad (2)$$

in which $\Delta V$=displaced volume, D=distance of displacement of a container wall and A=surface area of the displaced container wall facing in a direction opposite to the direction of displacement.

To measure the distance of displacement, for instance an encoder coupled to the shaft 31 of the motor 26 can measure the angular movement of the shaft 31 and of drums 32 on the shaft 31, around which drums 32 ends of core cables 24 of the Bowden cable 22 are wound. This encoder generates a number of pulses per turn. As the container 19 is filled, it expands in one direction. This expansion is converted into a turning motion of the motor shaft 31. The rotation of the motor shaft 31, and accordingly the number of pulses generated by the encoder, is therefore linearly related to the volume of fluid displaced into the container 19.

The force the motor 26 exerts, is linearly proportional to the electrical current fed to or generated by the motor 26, so that, by controlling the electric current to and from the motor 31, pressure in the container 19 is controlled and monitored. An additional pressure sensor in the ventricular cavity 3 (inside or outside of the bag 17) or in the container 19 can increase the accuracy of the pressure measurement.

After at least most of the displacement of fluid into the container 19, the exerted pressure is reduced and flow of fluid into the container 19 comes to a standstill (FIG. 2D).

Subsequently, the ventricular wall relaxes and fluid flows back into the bag 17 in the left ventricle 3. A force exerted onto the container 19 results in a preload pressure in the bag 17 in the left ventricle (FIG. 2A), which simulates preload from the left atrium during diastole.

Thus, ventricular pressure and ventricular volume can be measured through a heartbeat cycle and represented in a pressure/volume (PV) loop. An example of such a PV-loop is schematically shown in FIG. 3 in which the phases illustrated in FIGS. 2A-2D are indicated by corresponding reference numbers in circles.

The PV curve plots the ventricle pressure (Y-axis) versus ventricle volume (X-axis). Starting at the bottom left corner, opening of the mitral valve 5 is simulated and an inflow of blood into the bag 17 in the left ventricle 3 causes the left ventricle volume to increase, while pressure in the left ventricle 3 increases only slightly as a result of simulation of preload from the atrium (the phase shown in FIG. 2A).

When the left ventricle 3 has been filled, the ventricles contract, so that pressure increases. Resistance exerted onto the container 19 simulates closing of the mitral valve and counter pressure from the aorta (the phase shown in FIG. 2B).

In-vivo, the increasing pressure in the left ventricle would subsequently cause the aortic valve 4 to open when this pressure has exceeded the pressure in the aorta, and would cause an outflow of blood into the aorta. This is simulated by allowing the container 19 to expand while the pressure still rises simulating the increasing flow resistance and elasticity of the cardiovascular system and inertia of the blood displaced by the pumping action of the heart (the phase shown in FIG. 2C).

Next, the heart relaxes, so the pressure decreases. The decrease of pressure with no or very little increase of volume in the left ventricle 3 (the phase illustrated in FIG. 2D) simulates the in-vivo stage starting when the aortic valve 4 closes up to the moment when pressure in the left ventricle 3 becomes lower than the pressure in the left atrium so that the mitral valve 5 opens and the left ventricle 3 fills with blood.

In the proposed concept the pressures, volumes, valve openings and closings can be simulated by software. The control of exerted forces can be based on controlled pressure or based on controlled flow rate. Control of pressure can be based on measured flow rate and controlled flow rate can be based on measured pressure. In vivo, the inflow and the outflow are related to the ventrical pressure in accordance with flow characteristics, in particular the flow resistance and elasticity of the cardiovascular system and inertia of the displaced blood. The flow characteristics of the outflow preferably simulate in vivo flow characteristics of outflow into the aorta and all successive vessels and organs and the flow characteristics of the inflow preferably simulate in vivo flow characteristics of flow from left atrium to left ventricle 3.

The combination of flow resistance, elastic compliance and inertia is defined as the impedance. The impedance may be adjustable and also variation of impedance over a cycle may be provided for and may also be adjustable. In particular, preload may gradually be increased for testing stress resistance. A viable heart will typically increase output (heterometric autoregulation) in response to an increasing preload while a heart with poor viability will typically return a decreased output if preload is gradually increased. Also muscle cell contraction can be tested at different afterload levels.

For the outflow, after the aorta valve opens, the flow rate is related to the pressure in accordance with the impedance of the aorta and downstream vessels and organs:

$$P = Q \cdot I_{aorta} \quad (3)$$

in which P=pressure, Q=flow rate and $I_{aorta}$=the fluidic impedance of the aorta and downstream vessels and organs.

To generate a simulation of in-vivo pressure P, the measured flow rate is multiplied by a predetermined impedance, the calculated pressure is multiplied by the surface area in the direction of displacement in accordance with equation (1) and the motor control 27 controls the motor 26 to exert the calculated force F. The force is controlled by the electrical current applied to the motor 26.

The flow rate can be measured by sensing the volume change of the container 19 over time. In formula:

$$Q = \Delta V_{container}/\Delta T \quad (4)$$

in which Q=flow rate, $\Delta V_{Container}$=displaced container volume and $\Delta T$=time over which displacement has been measured The change of volume in the container 19 can be measured by registering encoder pulses that are generated in accordance with angular movement of the shaft 31 and the drums 32 on the shaft around which ends of the core cables 24 of the Bowden cable 22 are wound. The time T between two pulses provides the $\Delta T$ for a volume change $\Delta V$ associated to the displacement of the container wall from one pulse to the next pulse. From these values the average flow rate Q in the time period between the two pulses in accordance with equation (4) can be calculated. When this flow rate Q is multiplied with the predetermined impedance I, the pressure P to be exerted and, via equation (1) the force F the motor 26 should exert on the core cables 24 connected to the container 19, can be calculated. From the calculated force F, the electrical current to be applied to the motor 26 can be determined, for instance by the motor control 27.

Because the calculated force F to be exerted trails the measured flow rate Q and because reaction by the motor 26 and the motor control 27 may take a response time, the exerted force F lags the flow rate Q on the basis of which it is determined. By arranging the system such that, at a given flow rate Q, encoder pulses are generated at a high frequency and carrying out the successive calculations of new values of force F at a high frequency as well, the time lag between flow rate measurement and exertion of the associated force can be reduced and a smooth adaptation of pressure P to flow rate Q can be achieved. The calculated force F may also be determined on the basis of a predicted value of the flow rate Q at the time the force F is to be applied. The prediction of the flow rate Q can for instance be made by Kalman filter calculations applied to previous predicted and measured values of the flow rate Q.

After the apparatus has been controlled to run during outflow into the aorta while the force F is controlled in accordance with the measured flow rate Q and virtual impedance of the aorta (FIG. 2C), displacement of the container wall stops because the left ventricle has reached its contracted state and pressure ebbs away as a result of an absence of flow Q (FIG. 2D) until an initial preload pressure is reached. As the left ventricle 3 relaxes, the preload pressure is controlled to increase as inward flow is detected (FIG. 2B). This simulates the in-vivo opening of the mitral valve 5.

In all phases of the heartbeat, the force to be exerted can be calculated by equations (3) and (1), each phase having a different impedance. However, the apparatus can also be controlled in a flow-controlled mode. In the flow controlled mode of operation, the pressure P will be measured and the flow rate Q is controlled in accordance with the measured pressure P, the pressure-flow rate equation (3), the flow rate displaced volume equation (4) and the relation between volume and displacement of equation (2).

It is also possible to switch between pressure controlled mode and a flow rate controlled mode during each heart beat cycle. For instance for operating in the pressure control mode during systole when the left ventricle actively pumps against a predetermined passive resistance (afterload) and for operating in a flow rate control mode during diastole in which the left ventricle is substantially passive and a predetermined pressure (preload) is applied to the left ventricle.

During operation, also the stroke volume of the left ventricle can be measured by measuring the total displacement of the container wall sensed by the encoder of the motor 26 and applying equation (2). Alternatively, the left ventricle volume can also be measured by measuring the total fluid volume during filling and subtracting the volume of the container 19 from the total volume.

Several features have been described as part of an example. However, it will be appreciated that the scope of the invention also includes embodiments having combinations of all or some of these features other than the specific combinations of features embodied in the example.

The invention claimed is:

1. An apparatus for ex-vivo measurement of performance of a human donor heart, comprising:
    a heart holder in a receptacle for holding the human donor heart ex vivo in the heart holder;
    a perfusion fluid supply conduit extending into the receptacle with a connector for connection to the human donor heart;
    a perfusion discharge conduit communicating with the interior space of the receptacle for collection of perfusion fluid drained from the human donor heart;
    a perfusion pump and an oxygenator connected between the perfusion fluid supply conduit and the perfusion discharge conduit;
    a bag for placement into a left ventricle of the human donor heart, the bag having a bag interior space;
    a fluid tight, compressible and expandable container having a container interior space communicating with the bag interior space;
    a sensor for measuring compression and expansion of the container; and
    an actuator for exerting a compression force on the container and an actuator control for varying the compression force;
    wherein the actuator and the actuator control are configured for controlling a preload pressure or fluid displacement or flow driving a fluid transfer from the container into the bag, wherein the actuator and the actuator control are configured for at least controlling the preload pressure or fluid displacement or flow by:
        controlling a force urging the container into compression in accordance with a measured rate of compression or expansion of the container and with at least one predetermined fluidic impedance value, and/or
        controlling a rate of compression or expansion of the container in accordance with at least measured force urging the container into compression or a measured pressure in the container or in the bag and with at least one predetermined fluidic impedance value.

2. The apparatus according to claim 1, wherein the sensor and the actuator are integrated.

3. The apparatus according to claim 1, wherein the sensor is arranged for sensing an expansion force exerted by the container and a registration unit connected to the sensor for registering sensed expansion forces.

4. The apparatus according to claim 1, wherein the container is arranged for expansion and compression in substantially one direction only.

5. The apparatus according to claim 1, in which the container is in the form of a bellow or in the form of a cylinder in which a plunger or piston is movable.

6. An apparatus for ex-vivo measurement of performance of a human donor heart, comprising:
a heart holder in a receptacle for holding the human donor heart;
a perfusion fluid supply conduit extending into the receptacle with a connector for connection to the human donor heart;
a perfusion discharge conduit communicating with the interior space of the receptacle for collection of perfusion fluid drained from the human donor heart;
a perfusion pump and an oxygenator connected between the perfusion fluid supply conduit and the perfusion discharge conduit;
a bag for placement into a left ventricle of the human donor heart, the bag having a bag interior space;
a fluid tight, compressible and expandable container having a container interior space communicating with the bag interior space; and
a sensor for measuring compression and expansion of the container,
wherein the heart holder includes an enclosure for enclosing the human donor heart, the bag and the container, wherein at least the sensor is arranged outside of the enclosure, and further comprising a motion transfer mechanism extending from the container to at least the sensor for transferring motion between the container and the sensor.

7. The apparatus according to claim 6, wherein the motion transfer mechanism includes at least one Bowden cable.

8. The apparatus according to claim 7, wherein at least the sensor is connected to a drum around which at least one inner cable of the at least one Bowden cable is wound.

9. A method of using an apparatus for ex-vivo measurement of performance of the human donor heart obtained from a deceased donor, wherein the apparatus comprises:
a heart holder in a receptacle for holding the human donor heart;
a perfusion fluid supply conduit extending into the receptacle with a connector for connection to the human donor heart;
a perfusion discharge conduit communicating with the interior space of the receptacle for collection of perfusion fluid drained from the human donor heart;
a perfusion pump and an oxygenator connected between the perfusion fluid supply conduit and the perfusion discharge conduit;
a bag for placement into a left ventricle of the human donor heart, the bag having a bag interior space;
a fluid tight, compressible and expandable container having a container interior space communicating with the bag interior space; and
a sensor for measuring compression and expansion of the container;
wherein the method comprises:
holding the human donor heart ex-vivo in the heart holder;
providing said bag into the left ventricle of the human donor heart;
circulating perfusion fluid through the human donor heart through a circuit including said perfusion pump and said oxygenator, including supplying perfusion fluid to coronary arteries of the human donor heart and discharging perfusion fluid collected from the human donor heart;
measuring said compression and said expansion of the container by the sensor while the human donor heart is beating; and
controlling a preload pressure or fluid displacement or flow driving a fluid transfer from the container into the bag, wherein at least the preload pressure or fluid displacement or flow is controlled by:
controlling a force urging the container into compression in accordance with a measured rate of compression or expansion of the container and with at least one predetermined fluidic impedance value, or
controlling a rate of compression or expansion of the container in accordance with at least a measured force urging the container into compression or a measured pressure in the container or in the bag and with at least one predetermined fluidic impedance value.

10. The method according to claim 9, wherein the bag has a bag wall and wherein, at a maximum volume of the bag during the measurements, the bag wall is free from elastic stretch in a plane of the bag wall.

11. A method of using an apparatus for ex-vivo measurement of performance of the human donor heart obtained from a deceased donor, wherein the apparatus comprises:
a heart holder in a receptacle for holding the human donor heart;
a perfusion fluid supply conduit extending into the receptacle with a connector for connection to the human donor heart;
a perfusion discharge conduit communicating with the interior space of the receptacle for collection of perfusion fluid drained from the human donor heart;
a perfusion pump and an oxygenator connected between the perfusion fluid supply conduit and the perfusion discharge conduit;
a bag for placement into a left ventricle of the human donor heart, the bag having a bag interior space;
a fluid tight, compressible and expandable container having a container interior space communicating with the bag interior space; and
a sensor for measuring compression and expansion of the container;
wherein the method comprises:
holding the human donor heart ex-vivo in the heart holder;
providing said bag into the left ventricle of the human donor heart;
circulating perfusion fluid through the human donor heart through a circuit including said perfusion pump and said oxygenator, including supplying perfusion fluid to coronary arteries of the human donor heart and discharging perfusion fluid collected from the human donor heart;
measuring said compression and said expansion of the container by the sensor while the human donor heart is beating;
controlling a preload pressure or fluid displacement or flow driving a fluid transfer from the container into the bag, wherein at least the preload pressure or fluid displacement or flow is controlled by:

controlling a force urging the container into compression in accordance with a measured rate of compression or expansion of the container and with at least one predetermined fluidic impedance value, and controlling a rate of compression or expansion of the container in accordance with at least measured force urging the container into compression or a measured pressure in the container or in the bag and with at least one predetermined fluidic impedance value; and controlling an afterload pressure or fluid displacement or flow counteracting a fluid flow from the bag into the container, wherein at least the afterload pressure or fluid displacement or flow is controlled by:

controlling a rate of compression or expansion of the container in accordance with at least measured force urging the container into compression or a measured pressure in the container or in the bag and with at least one predetermined fluidic impedance value, and controlling a force urging the container into compression in accordance with a measured rate of compression or expansion of the container and with at least one predetermined fluidic impedance value.

12. A method of using an apparatus for ex-vivo measurement of performance of the human donor heart obtained from a deceased donor, wherein the apparatus comprises:

a heart holder in a receptacle for holding the human donor heart;

a perfusion fluid supply conduit extending into the receptacle with a connector for connection to the human donor heart;

a perfusion discharge conduit communicating with the interior space of the receptacle for collection of perfusion fluid drained from the human donor heart;

a perfusion pump and an oxygenator connected between the perfusion fluid supply conduit and the perfusion discharge conduit;

a bag for placement into a left ventricle of the human donor heart, the bag having a bag interior space;

a fluid tight, compressible and expandable container having a container interior space communicating with the bag interior space, wherein the bag interior space and the container interior are in fluid flow communication via a mitral valve only; and a sensor for measuring compression and expansion of the container;

wherein the method comprises:
holding the human donor heart ex-vivo in the heart holder;

providing said bag into the left ventricle of the human donor heart;

circulating perfusion fluid through the human donor heart through a circuit including said perfusion pump and said oxygenator, including supplying perfusion fluid to coronary arteries of the human donor heart and discharging perfusion fluid collected from the human donor heart; and measuring said compression and said expansion of the container by the sensor while the human donor heart is beating, and wherein fluid flow through an aortic valve of the human donor heart from or to the left ventricle is prevented.

13. A method of using an apparatus for ex-vivo measurement of performance of the human donor heart obtained from a deceased donor, wherein the apparatus comprises:

a heart holder in a receptacle for holding the human donor heart;

a perfusion fluid supply conduit extending into the receptacle with a connector for connection to the human donor heart;

a perfusion discharge conduit communicating with the interior space of the receptacle for collection of perfusion fluid drained from the human donor heart;

a perfusion pump and an oxygenator connected between the perfusion fluid supply conduit and the perfusion discharge conduit;

a bag for placement into a left ventricle of the human donor heart, the bag having a bag interior space;

a fluid tight, compressible and expandable container having a container interior space communicating with the bag interior space; and a sensor for measuring compression and expansion of the container;

wherein the method comprises:
holding the human donor heart ex-vivo in the heart holder;

providing said bag into the left ventricle of the human donor heart;

circulating perfusion fluid through the human donor heart through a circuit including said perfusion pump and said oxygenator, including supplying perfusion fluid to coronary arteries of the human donor heart and discharging perfusion fluid collected from the human donor heart;

measuring said compression and said expansion of the container by the sensor while the human donor heart is beating; and controlling an afterload pressure or fluid displacement or flow counteracting a fluid flow from the bag into the container, wherein at least the afterload pressure or fluid displacement or flow is controlled by controlling a force urging the container into compression in accordance with a measured rate of compression or expansion of the container and with at least one predetermined fluidic impedance value.

14. A method of using an apparatus for ex-vivo measurement of performance of the human donor heart obtained from a deceased donor, wherein the apparatus comprises:

a heart holder in a receptacle for holding the human donor heart;

a perfusion fluid supply conduit extending into the receptacle with a connector for connection to the human donor heart;

a perfusion discharge conduit communicating with the interior space of the receptacle for collection of perfusion fluid drained from the human donor heart;

a perfusion pump and an oxygenator connected between the perfusion fluid supply conduit and the perfusion discharge conduit;

a bag for placement into a left ventricle of the human donor heart, the bag having a bag interior space;

a fluid tight, compressible and expandable container having a container interior space communicating with the bag interior space; and a sensor for measuring compression and expansion of the container;

wherein the method comprises:
holding the human donor heart ex-vivo in the heart holder;

providing said bag into the left ventricle of the human donor heart;

circulating perfusion fluid through the human donor heart through a circuit including said perfusion pump and said oxygenator, including supplying perfusion fluid to coronary arteries of the human donor heart and discharging perfusion fluid collected from the human donor heart;

measuring said compression and said expansion of the container by the sensor while the human donor heart is beating; and controlling an afterload pressure or fluid displacement or flow counteracting a fluid flow from the bag into the container, wherein at least the afterload pressure or fluid displacement or flow is controlled by controlling a rate of compression or expansion of the container in accordance with at least measured force urging the container into compression or a measured pressure in the container or in the bag and with at least one predetermined fluidic impedance value.

15. An apparatus for ex-vivo measurement of performance of a human donor heart, comprising:

a heart holder in a receptacle for holding the human donor heart ex-vivo in the heart holder;

a perfusion fluid supply conduit extending into the receptacle with a connector for connection to the human donor heart;

a perfusion discharge conduit communicating with the interior space of the receptacle for collection of perfusion fluid drained from the human donor heart;

a perfusion pump and an oxygenator connected between the perfusion fluid supply conduit and the perfusion discharge conduit;

a bag for placement into a left ventricle of the human donor heart, the bag having a bag interior space;

a fluid tight, compressible and expandable container having a container interior space communicating with the bag interior space;

a sensor for measuring compression and expansion of the container; and an actuator for exerting a compression force on the container and an actuator control for varying the compression force;

wherein the actuator and the actuator control are configured for controlling an afterload pressure or fluid displacement or flow counteracting a fluid flow from the bag into the container, wherein the actuator and the actuator control are configured for at least controlling the afterload pressure or fluid displacement or flow by:

controlling a force urging the container into compression in accordance with a measured rate of compression or expansion of the container and with at least one predetermined fluidic impedance value, and/or controlling a rate of compression or expansion of the container in accordance with at least measured force urging the container into compression or a measured pressure in the container or in the bag and with at least one predetermined fluidic impedance value.

16. The apparatus according to claim 15, wherein the sensor and the actuator are integrated.

17. The apparatus according to claim 15, wherein the sensor is arranged for sensing an expansion force exerted by the container and a registration unit connected to the sensor for registering sensed expansion forces.

18. The apparatus according to claim 15, wherein the container is arranged for expansion and compression in substantially one direction only.

19. The apparatus according to claim 15, in which the container is in the form of a bellow or in the form of a cylinder in which a plunger or piston is movable.

* * * * *